No. 854,135. PATENTED MAY 21, 1907.
J. R. WHITTEMORE.
GASKET.
APPLICATION FILED MAY 11, 1906.
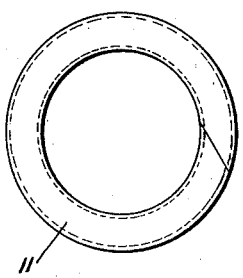
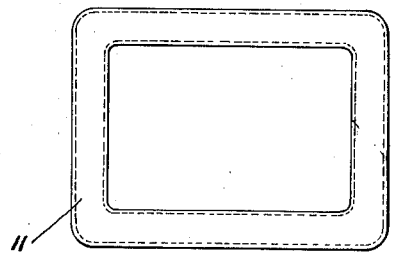
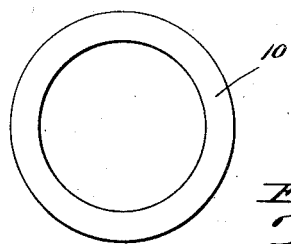
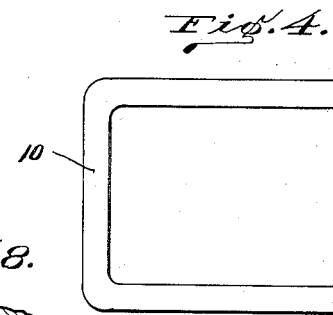
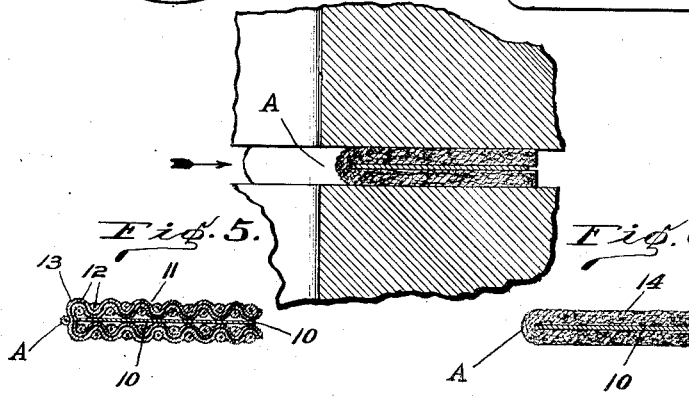
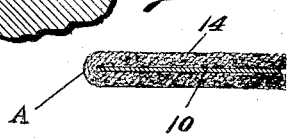
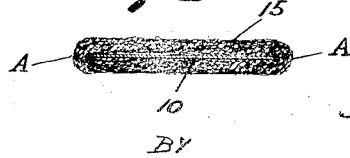
Inventor
John R. Whittemore
By
Bradford & Hood.
Attorneys.
Witnesses
Frank A. Sahle
Thomas W. McMeans

UNITED STATES PATENT OFFICE.

JOHN R. WHITTEMORE, OF INDIANAPOLIS, INDIANA.

GASKET.

No. 854,135.   Specification of Letters Patent.   Patented May 21, 1907.

Application filed May 11, 1906. Serial No. 316,302.

*To all whom it may concern:*

Be it known that I, JOHN R. WHITTEMORE, a citizen of the United States, residing at Indianapolis, in the county of Marion and State of Indiana, have invented certain new and useful Improvements in Gaskets, of which the following is a specification.

In producing steam-tight, or other pressure-tight, joints by means of gaskets difficulty is experienced in keeping the gasket in position against the pressure. It has heretofore been proposed to use thin copper or other ductile metal in the form of gaskets but such material soon becomes brittle and also becomes so corroded as to be useless. Where fabric gaskets are used they lack sufficient transverse rigidity to accomplish desired results.

I have discovered that, by providing a fabric gasket with a transversely-stiff strengthening core, a very satisfactory, cheap and efficient gasket may be produced.

The accompanying drawings illustrate my invention:

Figure 1 is a plan of a round gasket constructed in accordance with my discovery; Fig. 2 a similar view of a rectangular gasket; Fig. 3 a plan of the core of the gasket shown in Fig. 1; Fig. 4 a plan of the core shown in Fig. 2; Fig. 5 a transverse section, highly magnified, of a gasket constructed in accordance with my invention; Fig. 6 a similar view of another form; Fig. 7 a similar view of another form; Fig. 8 a similar view showing the manner of use.

In the drawings 10 indicates a gasket core of transversely stiff material such, for instance, as thin copper or any other suitable material. Incasing the core 10 is a compressible fabric covering which, on the pressure edge of the gasket, is continuous as shown at A. In Fig. 5 the fabric 11 is a standard fabric sheet-packing found in the market, this packing being formed of woven threads each of which is composed of a central core 12 of very fine flexible wire, and a covering 13 of asbestos or other suitable material. In the form shown in Fig. 5 the core 10 is incased by doubling the fabric 11 over the core the line of fold of the fabric being presented to the fluid pressure as indicated.

In Fig. 6 a doubled strip of any ordinary woven or felted packing fabric 14 is illustrated, while in Fig. 7 the core 10 is shown as completely incased in a casing of packing fabric 15. In this last form either edge of the gasket may be subjected to pressure.

By the combination of the fabric face and the transversely stiff core I find it possible to produce a packing which is fluid tight and will not blow out transversely. This packing is also useful in connection with superheated steam as the core furnishes sufficient transverse rigidity while the fabric covering prevents the two different metals from consequent corrosion and electrolytic action.

I claim as my invention:

1. A packing gasket comprising a central transversely-stiff core and a casing of packing fabric presenting a continuous portion at the pressure edge of the core.

2. A packing gasket comprising a central core of transversely stiff material and a casing of a strip of packing fabric doubled to embrace the pressure edge of the core.

3. A packing gasket comprising a metallic core and a casing of packing fabric presenting a continuous portion at the pressure edge of the core.

4. A packing gasket comprising a transversely stiff metallic core lying between a strip of packing fabric doubled over the core at its pressure edge.

5. A packing gasket comprising a central core of transversely stiff material incased in a strip of a woven fabric composed of threads having a metallic core covered by a compressible packing, and doubled over the core at its pressure edge.

6. A packing gasket comprising a transversely stiff metallic core lying between a strip of a packing fabric woven from threads consisting of a metallic core covered by a compressible packing, and doubled over the core at its pressure edge.

7. A packing gasket comprising a central core of transversely stiff material lying between a strip of compressible packing material, doubled over the pressure edge of the core.

8. A packing gasket comprising a transversely stiff metallic core lying between a strip of compressible packing doubled over at its pressure edge.

In witness whereof, I, have hereunto set my hand and seal at Indianapolis, Indiana, this 7th day of May, A. D. one thousand nine hundred and six.

JOHN R. WHITTEMORE. [L. S.]

Witnesses:
ARTHUR M. HOOD,
THOMAS W. McMEANS.